3,326,649
FUEL COMPOSITIONS
Richard L. Ferm, El Cerrito, and Robert E. Paterson, Orinda, Calif., assignors to Chevron Research Company, a corporation of Delaware
No Drawing. Filed Mar. 27, 1963, Ser. No. 268,484
3 Claims. (Cl. 44—64)

The present invention is concerned with non-clogging fuel oil compositions. More specifically, it is concerned with residual type fuel compositions which consist of blends of residual and distillate oils containing new additives that prevent clogging and sludging by such oils.

Residual fuels derived from petroleum are widely used in marine and stationary steam power plants where the low cost and high B.t.u. content of these fuels make them economically attractive. The major portion of these fuels is derived from the residual products or blends thereof obtained from refining operations, such as distillation of crudes, the flashing or distillation of cracked products and redistillation operations. Inasmuch as the viscosity of residual fuel oils is one of its more important properties, and fuels of varying viscosity are often needed to meet specific uses, it is sometimes necessary when a particular residuum is too viscous, to dilute it with a low viscosity distillate fraction. However, due to the presence of dissolved asphaltenes in residual oils, the choice of particular distillate fractions to be used as diluents becomes critical and thereby severely limited.

Asphaltenes normally present in residual oils are asphaltic substances which are soluble in carbon tetrachloride or carbon disulfide, but insoluble in n-pentane or petroleum ether. While these asphaltenes are ordinarily soluble in residual oils, blending of these oils with any of a large number of distillate fractions will result in precipitation of the asphaltenes, rendering the compositions unsuitable for use as fuel oils. The precipitated asphaltenes deposit upon surfaces with which they come in contact, clogging filters, screens and conduit lines and leaving especially heavy deposits upon heated equipment, such as storage tank heaters, preheaters and burners. Thus in blending residual fuel oil compositions, great care must be taken to avoid blending of the residua with distillates which are poor asphaltene solvents.

It has been found that the addition of minor amounts of the hydrazine salts of phosphosulfurized polybutenes to residual fuel oil blends will render soluble the asphaltenes which would normally precipitate from such blends. Thus with the addition of small quantities of these materials, the combination of residual oils with distillate fractions may be accomplished without harmful asphaltene precipitation.

A preferred embodiment of the solubilizing agent of this invention is the hydrazine salt of a $P_2S_5$ polyisobutylene reaction product derived from polyisobutylene having a molecular weight of about 840.

The additives of this invention are added in minor amounts sufficient to inhibit sludging. Generally, the preferred amounts are from 0.01 to 10% by weight based upon the quantity of residual oil present.

Polybutenes suitable for the reaction with phosphorus sulfides are those having a molecular weight between about 200 and 2000, and preferably between 500 and 1000. A preferred species is a polyisobutylene having a molecular weight of about 840.

The phosphorus sulfide-polyisobutylene reaction product may be readily obtained by reacting the olefin with a phosphorus sulfide, such as $P_2S_5$, at temperatures between 200° F. and 500° F., using between about 5% to 25% by weight of the phosphorus sulfide. An inert diluent, such as mineral oil, may be used to simplify handling of reactants. A ratio of reactants may be used that will provide between 0.5 and 1.5 atoms of phosphorus per mol of polybutene. However, a ratio of about 1 atom of phosphorus per mol of polybutene is preferred in order to simplify the separation of unreacted materials.

The following examples illustrate the preparation of the additives of this invention and are not intended to limit the scope of the invention.

Example I.—Preparation of polyisobutylene phosphorus-pentasulfide reaction product 4875 g. (5.805 mols) of polyisobutylene having a molecular weight of about 840 was charged to a 2½ gal. stainless steel bucket and heated to 200° C. with stirring. A slow stream of nitrogen was bubbled through the charge and maintained as a blanket by means of a foil cover placed over the bucket. 645 g. (2.90 mols) of $P_2S_5$ was added in small portions over a period of 1 hour. The mixture was then stirred for 7 hours at 200° C. At the end of this period 2289 g. of solvent refined mineral oil was added to form an oil solution which was filtered through diatomaceous earth. The product analyzed 2.31% P and 3.80% S.

Example II.—Preparation of hydrazine salt 1006.4 g. of the product of Example I was charged to a 2-liter, 3 neck flask equipped with a stirrer, reflux condenser and a thermometer. The solution was heated to 50° C. with stirring and 101.9 g. (3.015 mols) of 95% hydrazine was added in small portions over a period of one-half hour while the temperature was held at 70° C. by air-cooling of the flask. The temperature was then raised to about 120° C. and held at that temperature for 6 hours with constant stirring. The product was then stripped of volatile constituents by distilling to a temperature of 135° C. under a vacuum of 10 mm. Hg. The product displayed the following characteristics:

P _____percent__ 1.90
S _____do____ 3.22
N _____do____ 3.42
Density 20/4 _____ 0.9322
Refractive Index at 20° _____ 1.5062

An asphaltene solubility test was employed to ascertain the effectiveness of these types of compounds as solubilizing additives. In this test a solution is prepared consisting of 0.1 g. of asphaltenes per 2.5 ml. of α-methyl naphthalene which is a good asphaltene solvent. Cetane (hexadecane), which is a poor solvent for asphaltenes, is added to a 2.5 ml. portion of the asphaltene solution containing the material being tested until precipitation of the asphaltenes occurs. A substance which, when present in an amount equal to that of the dissolved asphaltenes, allows addition of 5–6 ml. of cetane before precipitation is considered to be an acceptable asphaltene solubilizing agent. Table I embodies the results of tests performed using various phosphorus-sulfide-polyisobutylene derivatives. The concentration of added compound is expressed in grams added to each 2.5 ml. portion of asphaltene solution.

TABLE I.—CETANE ADDED TO CAUSE FLOCCULATION

| Additive | Weight Additive (Grams) | Cetane (ml.) |
| --- | --- | --- |
| Hydrazine Salt of $P_2S_5$ Polybutene Reaction Product (polyisobutylene m.w.=840) | 0.01 | 3.2 |
| Do | 0.03 | 4.1 |
| Do | 0.10 | 100+ |
| Hydrolyzed $P_2S_5$-Polyisobutylene Reaction Product (polyisobutylene m.w.=400) | 0.10 | 2.8 |
| Hydrolyzed $P_2S_5$-Polybutene Reaction Product (Polyisobutylene m.w.=840) | 0.10 | 4.0 |
| Propylene diamine salt of $P_2S_5$-polyisobutene Reaction Product (polyisobutylene m.w.=840) | 0.10 | 3.3 |

As indicated by the above data, the hydrazine salt of $P_2S_5$-polyisobutylene reaction product greatly increases the solubility of asphaltenes in cetane, increasing it to a surprisingly greater degree than the related free acids and the diamine salt.

The efficacy of the additives of this invention is further confirmed by the Thermal Stability of U.S. Navy Special Fuel Oil Test ASTM D-1661-59T. In this test, the addition of 6% of the hydrazine salt of a $P_2S_5$ polyisobutylene reaction product derived from polyisobutylene having a molecular weight of about 840 to an "unstable" fuel oil successfully eliminated formation of carbonaceous deposits.

Use of the additives of this invention with a wide variety of blended residual fuel oils or burner fuel oils is contemplated. The U.S. Department of Commerce classifies residual fuels as No. 5, which are essentially distillate oils with small amounts of residual materials, and No. 6, which are true residual fuel oils. Use of the additives of this invention would be equally applicable in both types, as blends with distillate components are common in each case.

We claim:

1. A hydrocarbon fuel oil composition having superior nonclogging properties consisting essentially of:
   (A) a major proportion, from 90 to 99.99% by weight, of residual fuel oil blend consisting of the residual fuel oil and a distillate fuel oil fraction, and
   (B) as an asphaltene solubilizing additive, a minor proportion from 0.01 to 10% by weight of the hydrazine salt of a phosphosulfurized polyisobutylene obtained by reacting a phosphorus sulfide with a polyisobutylene having a molecular weight between about 200 and 2000, at a temperature between 200° and 500° F.

2. The composition of claim 1 in which the phosphorus sulfide is $P_2S_5$.

3. The composition of claim 2 in which the polyisobutylene has a molecular weight between 500 and 1000.

References Cited

UNITED STATES PATENTS

| | | | |
| --- | --- | --- | --- |
| 2,316,080 | 4/1943 | Loane | 252—400 X |
| 2,316,082 | 4/1943 | Loane | 252—400 X |
| 2,516,119 | 7/1950 | Hersh | 260—139 |
| 2,658,062 | 11/1953 | Jones | 260—139 |
| 2,767,165 | 10/1956 | Smith | 260—139 |
| 3,051,654 | 8/1962 | Blaha | 260—139 X |
| 3,080,223 | 3/1963 | Monnikendam | 44—62 |

DANIEL E. WYMAN, *Primary Examiner.*

C. O. THOMAS, Y. H. SMITH, *Assistant Examiners.*